Figure 1:
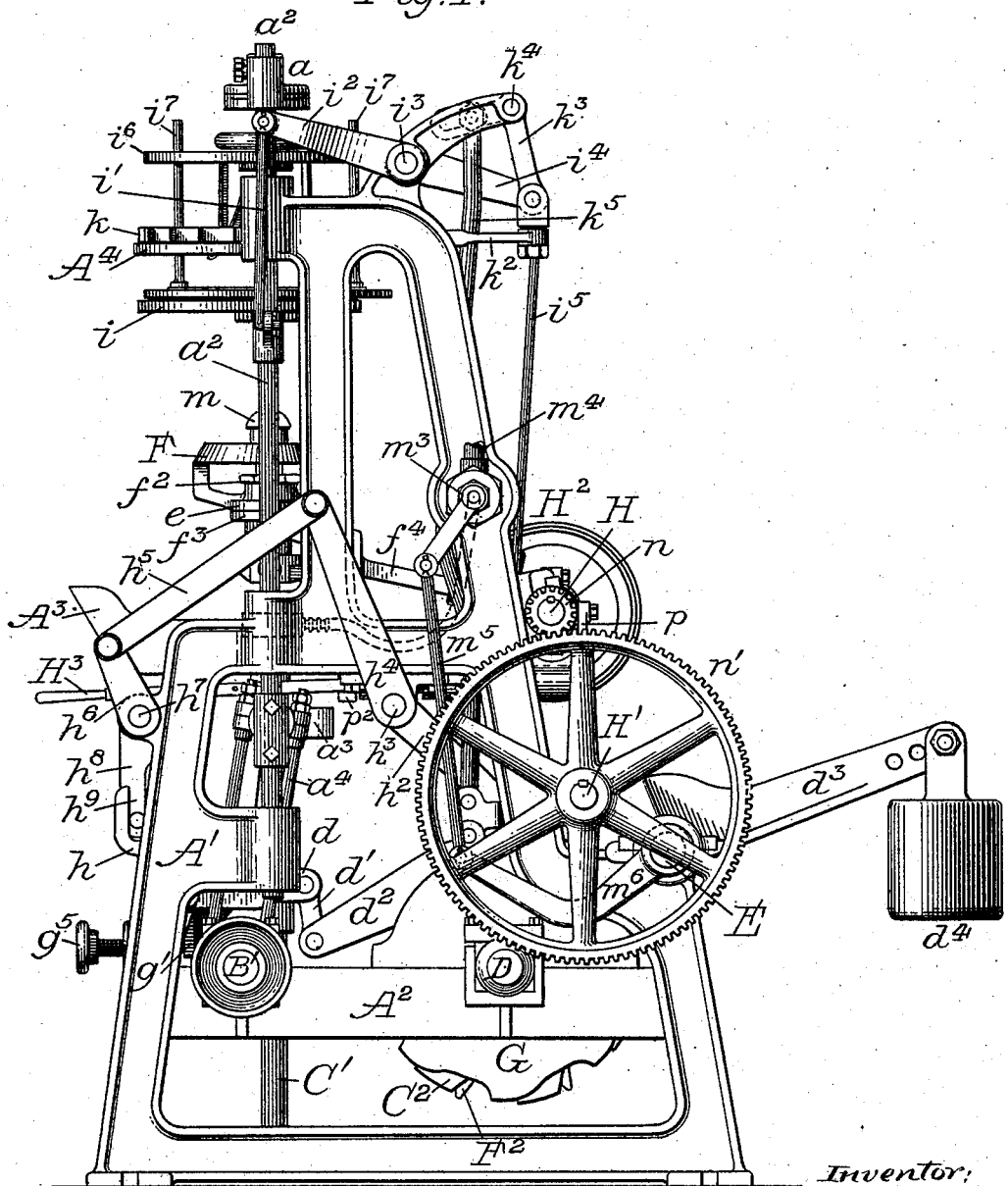

(No Model.) 6 Sheets—Sheet 1.

R. EICKEMEYER, Dec'd.
R. EICKEMEYER, JR., Executor.
HAT STRETCHING MACHINE.

No. 576,100. Patented Feb. 2, 1897.

Attest:
Howell Beatti
Emma E. Mart.

Inventor:
Rudolf Eickemeyer, Jr.,
Executor of the Estate of
Rudolf Eickemeyer, Deceased.
By Wm C. Mead
Attorney.

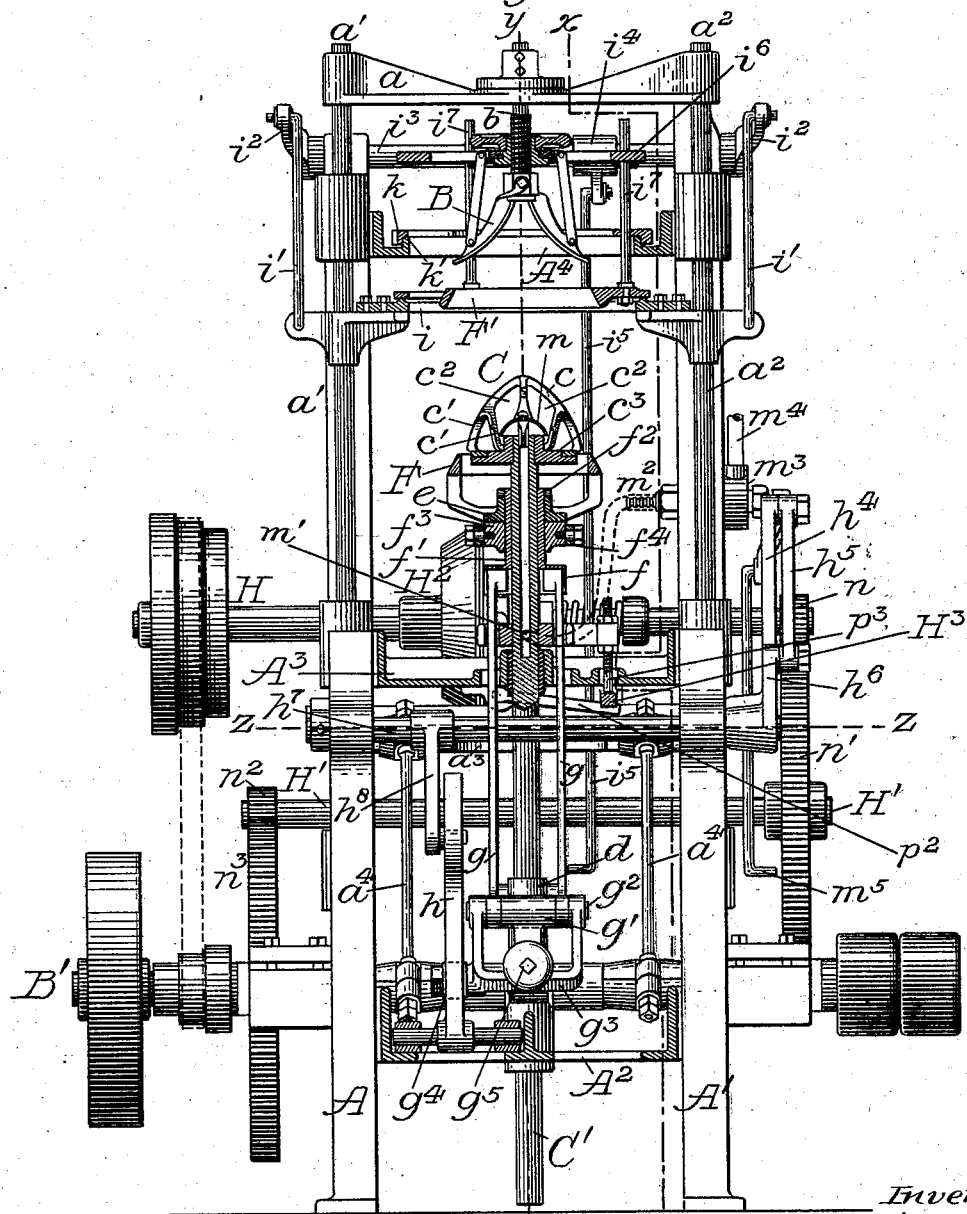

(No Model.) 6 Sheets—Sheet 3.
R. EICKEMEYER, Dec'd.
R. EICKEMEYER, JR., Executor.
HAT STRETCHING MACHINE.
No. 576,100. Patented Feb. 2, 1897.
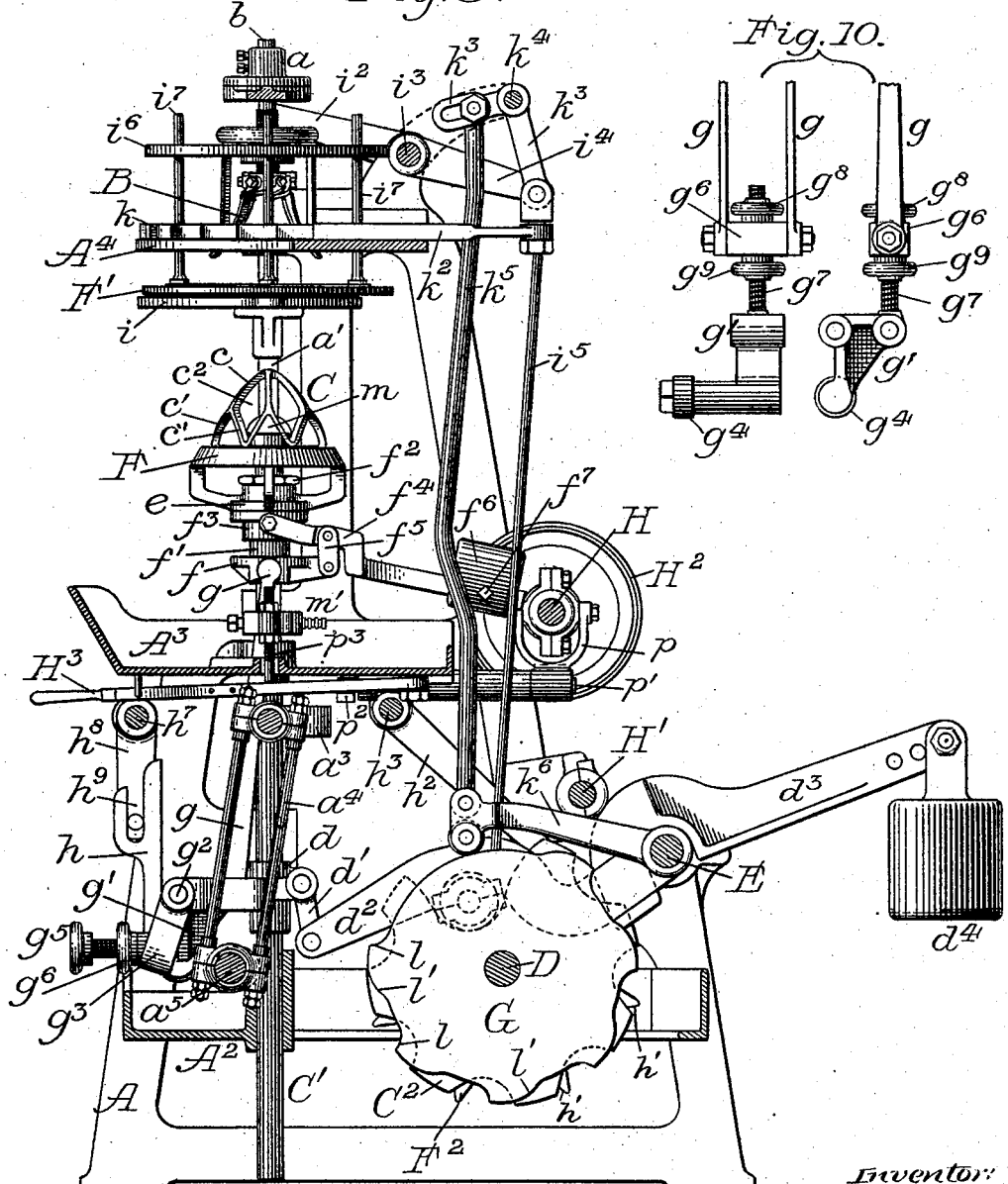
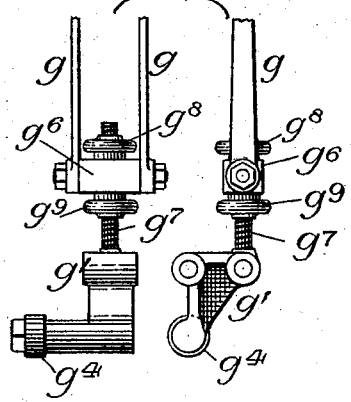
Attest:
Howell Battle
Emma B. Marts
Inventor:
Rudolf Eickemeyer, Jr.,
Executor of the Estate of
Rudolf Eickemeyer, Deceased.
By Wm C Moore
Attorney.

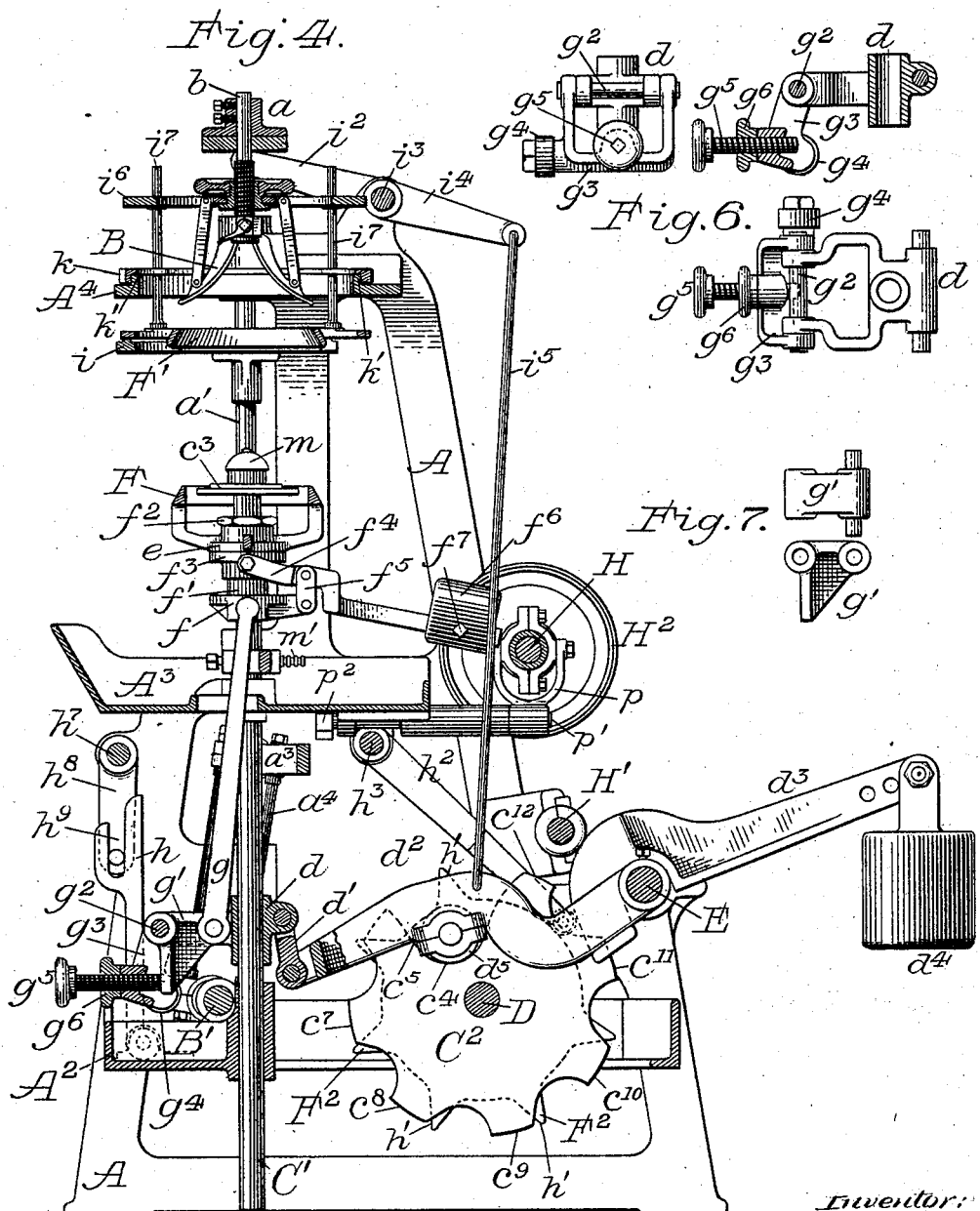

(No Model.) 6 Sheets—Sheet 5.
R. EICKEMEYER, Dec'd.
R. EICKEMEYER, JR., Executor.
HAT STRETCHING MACHINE.
No. 576,100. Patented Feb. 2, 1897.
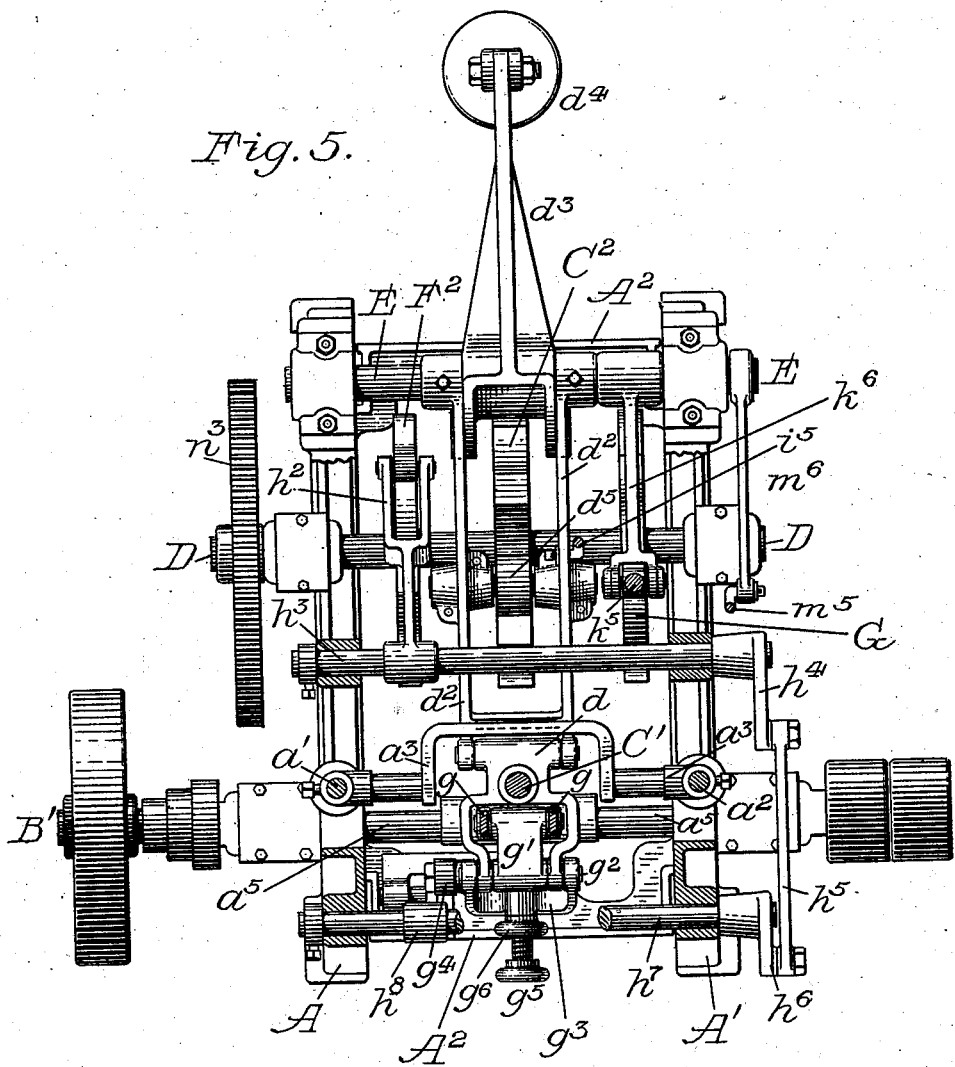

(No Model.) 6 Sheets—Sheet 6.

R. EICKEMEYER, Dec'd.
R. EICKEMEYER, JR., Executor.
HAT STRETCHING MACHINE.

No. 576,100. Patented Feb. 2, 1897.

Attest:
Howell Battle
Emma C. Marks

Inventor:
Rudolf Eickemeyer, Jr.
Executor of the Estate of
Rudolf Eickemeyer, Deceased.
By
Attorney.

THE NORRIS PETERS CO., PHOTO-LITHO., WASHINGTON, D. C.

UNITED STATES PATENT OFFICE.

RUDOLF EICKEMEYER, JR., OF YONKERS, NEW YORK, EXECUTOR OF RUDOLF EICKEMEYER, DECEASED.

HAT-STRETCHING MACHINE.

SPECIFICATION forming part of Letters Patent No. 576,100, dated February 2, 1897.

Application filed August 8, 1895. Serial No. 558,623. (No model.)

*To all whom it may concern:*

Be it known that my father, RUDOLF EICKEMEYER, who prior to his decease resided in Yonkers, in the county of Westchester and State of New York, did in his lifetime invent certain new and useful Improvements in Hat-Stretching Machines; and I hereby declare that the following specification, taken in connection with the drawings furnished and forming a part of the same, is a clear, true, and complete description of the several features of his invention.

Machines embodying said improvements are restricted in their capacity to the stretching of the tips of hat-bodies, and they were devised with special reference to securing such prompt and perfect action as would enable each of such new machines to be profitably operated as one of a set or series including the rapid-acting automatic brim-stretching machine disclosed in Letters Patent No. 527,271, issued to my father October 9, 1894, and also including the most approved rapidly-acting automatic hat-blocking machine, so that all three machines may be operated successively on the same hat-body and be kept in practically continuous operation by one attendant. The present tip-stretching machine is therefore wholly automatic in its action, and it stands as the second in that line, the first known to me having been devised by my father and disclosed in Letters Patent No. 256,203, issued to him April 11, 1882.

An automatic tip-stretcher must have a capacity for rotating a hat-body during the intermitting action of the stretching-fingers upon the tip. In said first machines the rotating mechanism was so organized that rotative force was always applied to the hat-body, not only while the stretching-fingers were freed from the hat-body, but also while actually in stretching contact therewith, the tip of the hat-body then being tightly interposed between the stretching-fingers and the ribbed hat-support or "former." This rotative strain on the hat-body while so held by the fingers and former is conducive to a twisting distortion of the hat-body, especially in view of the fact that in said old machines the former and its controlling mechanism were so constructed and organized that even when freed from the fingers the hat-body could only be rotated under considerable torsional strain because of the adhesion of the hat-body to the ribbed former. This undue distortion of a hat-body, resulting from rotative strain at the brim while the tip is confined, causes an irregular presentation of the tip to the stretching-fingers, with lack of uniformity in the stretching action.

In machines embodying the present invention no twisting distortion of the hat-body is possible, because the rotating mechanism is operated intermittingly and when the hat-body is not only released from engagement by the tip-stretching fingers, but also freed from adhesion to the ribbed former.

In said prior machines the last action of the stretching-fingers on each hat-body left well-defined stretching-creases on the tip, which required care, time, and labor for their subsequent removal, but in the present machines the rotating mechanism, the stretching-fingers, the ribbed former, and its controlling mechanism are so constructed and organized that the final action on the hat-body removes the stretching-creases, and especially those last made by the fingers and former, so that when a hat-body is removed from the machine its stretched tip is smooth and symmetrical. In said prior machines the means by which the hat-bodies were held and put under the control of the rotating mechanism included several pairs of brim-clamping rings, each pair of which was restricted to use with hat-bodies of one size, thus involving a loss of time in making changes, which is wholly obviated in the use of the present machine, because it contains a single pair of brim-clamping rings so constructed and organized with the stretching devices and rotating mechanism as to be suited for reliable engagement with hat-bodies of all sizes.

The new machine is further improved in having the upper clamping-ring so organized with an annular cross-head and controlling mechanism that after each use it is mechanically lifted and maintained at its highest position and so far remote from the ribbed former that hat-bodies may be readily applied to and removed from said former, whereas in the old machine the clamping-ring after each use was dropped to its lowest position, and hence it was obstructive in the ready and prompt application to and removal of hat-bodies from the ribbed former.

The new machine has a ribbed former to which steam is automatically delivered, as disclosed in the aforesaid Letters Patent No. 527,271, and so controlled as to keep the tip of a hat-body highly heated and thoroughly moistened during the action of the stretching-fingers, whereas with the old machine all heating and moistening depended upon submerging the hat-bodies in hot water before putting them upon the ribbed former.

The new machine is constructed and organized so that it will not only stretch tips in about half the time required by the old machine, but perform the work in a much more satisfactory manner.

Figure 8:
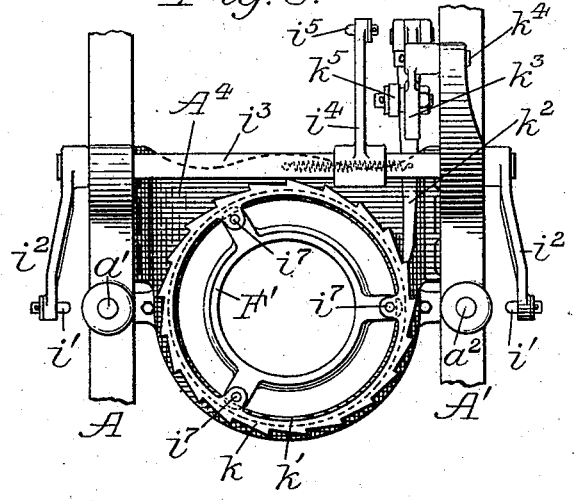
Figure 9:
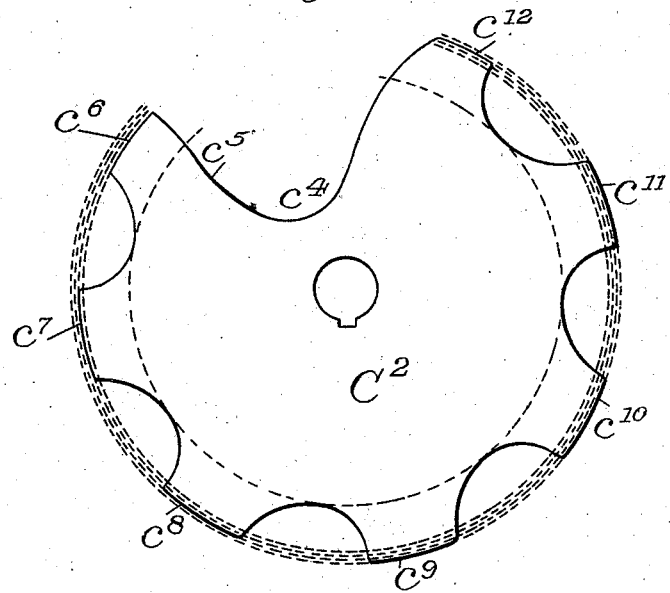

Referring to the six sheets of drawings, Figure 1 illustrates the novel automatic tip-stretching machine in side elevation. Fig. 2 illustrates said machine in front elevation with central portions thereof shown in section, but without the cams on the cam-shaft, and also without portions of the hat-rotating mechanism. Fig. 3 is a vertical section of the machine on line $x$, Fig. 2, and shows the ribbed former in position for service. Fig. 4 is a similar section on line $y$, Fig. 2, but without the ribbed former. Fig. 5 is a horizontal section on line $z$, Fig. 2, without certain pitmen which couple with the cranks on the main shaft. Fig. 6 illustrates in front, sectional, and top views the main cross-head by which the former-spindle is coupled to its controlling mechanism. Fig. 7, in top and side views, illustrates a bell-crank lever carried by the main cross-head. Fig. 8 is a plan view of the top of the machine, showing a part of the hat-clamp-rotating mechanism. Fig. 9 is a side view of the spindle-controlling cam on a larger scale than in the previous figures. Fig. 10, in two views, illustrates a modification of a bell-crank lever and links employed in the brim-clamp lifting and adjusting mechanism.

The frame of the machine is, as usual, composed of cast-metal plates bolted together, and includes the side plates A and A', a lateral plate $A^2$, near the bottom, and a central lateral plate $A^3$. Another plate $A^4$, near the top, has a large central annular opening and serves as a hub-support for a part of the hat-rotating mechanism, and also as a frame-plate.

The set of stretching-fingers at B (termed the "basket" in the shops) are similar to those heretofore employed, and they are suspended from a cross-head $a$ by a spindle $b$ and are provided with the usual means for adjusting the fingers at angles or positions appropriate to properly working on tips of hats of various sizes. The cross-head $a$ is firmly carried on vertical slidable rods $a'$ and $a^2$, having suitable upper and lower guide-bearings and mounted at their lower ends upon a cross-head $a^3$, which is operatively coupled by pitmen $a^4$ to appropriate cranks $a^5$ on the main shaft B'.

The cranks $a^5$ of this machine have much less throw than those in the prior automatic tip-stretching machine, (about one-half,) and the machine is so organized that the main shaft B' should be driven at a much greater speed, affording to the fingers nearly double the number of vibrations per minute that they could be properly operated at in the old machine.

The ribbed former C (termed the "star" in the shops) is unlike that employed in the prior automatic tip-stretcher, but it is similar to such as have been heretofore employed in hand-operated machines, and it is specially valuable in this machine, because its curved radial ribs $c$ are connected by inclined lateral ribs $c'$, affording angular spaces $c^2$, into which the appropriate stretching-fingers force portions of the tip of a hat-body in the act of stretching, and also because the ribs $c'$ serve to prevent undue adhesion of the hat-body to the radial ribs of the former, and thereby facilitate the rotative movement of the hat-body thereon. As usual in tip-stretchers, three sizes of formers are required for the many different sizes of hat-bodies, the stretching-fingers requiring a corresponding adjustment, and, as here shown, these parts are adapted to operate on the several medium sizes of hats. The former has a base-piece $c^3$, mounted upon a vertical slidable spindle C', having suitable guide-bearings in the lateral frame-plates $A^2$ and $A^3$. Vertical motion is imparted to the spindle and former by means of a cross-head $d$, secured to the spindle near its lower end, a link $d'$, lever $d^2$, and a cam $C^2$ on a cam-shaft D, the lever $d^2$ having for its fulcrum a rock-shaft E and having a rearwardly-extending arm $d^3$, provided with a weight $d^4$, adjustable thereon, for partially counterbalancing the spindle and its load and securing smooth and easy operation between the cam $C^2$ and an antifriction-roll $d^5$ on the lever $d^2$.

The cam $C^2$, although indicated in several figures in its working position, is separately shown in Fig. 9, and it is similar to the corresponding spindle-controlling cam employed in the automatic brim-stretching machine disclosed in the Letters Patent issued to my father October 9, 1894, No. 527,271, in having a stop-seat $c^4$, an initial long lifting-face $c^5$, and six equally-separated lifting-faces with corresponding drop-faces, but said prior cam had its several lifting-faces of the same capacity, or, in other words, the several resting or peripheral faces were equidistant from or concentric to the axis of the cam. In this cam $C^2$ the initial lifting-face at $c^5$ raises the spindle C' and the ribbed former to within three-eighths of an inch of the highest position, and the first resting-face at $c^6$ holds the spindle until the first drop-face is reached. The next or second lifting-face raises the spindle one-eighth of an inch higher than before, where it is maintained by the resting-face $c^7$ until the next drop, after which the spindle is raised another one-eighth of an inch, to the resting-face $c^8$, and then again to its full height at face $c^9$, at which it is maintained by the resting-faces $c^{10}$ and $c^{11}$ with the intervening dropping of the spindle, but the terminal lifting-face has a capacity like that of the third, so that the resting-face $c^{12}$ holds the spindle and ribbed former at one-eighth of an inch below its highest position, after which it is dropped, the roll $d^5$ of lever $d^2$ then occupying the stop-seat $c^4$. This lifting and lowering organization gradually presents a hat-body to the action of the tip-stretching devices and intermittingly releases it therefrom for enabling its rotation, and just before the spindle is finally lowered the hat is so lightly presented to the stretching-fingers that they remove the creases in the tip which resulted from the final stretching action.

As in the prior automatic tip-stretching machine before referred to, this machine has a brim-clamp, but its construction and its controlling mechanism involve many features of substantial novelty. The brim-clamp includes a lower clamping-ring F and an upper clamping-ring F', and these are now so organized that the one pair coöperates with the three sizes of ribbed formers, whereas in the old machine each former required at least its own pair of clamping-rings. The lower clamping-ring F has a hub $e$ and is concentric with the spindle C', it being slidably mounted upon a cross-head $f$, which has a vertical sleeve $f'$, and is slidably mounted on the spindle. The ring is rotative upon said cross-head, but is secured thereto by means of a nut $f^2$ at the top of said sleeve. Below the hub of the ring F there is a slidable collar $f^3$ on the sleeve $f'$, which is supported by a forked lever $f^4$, fulcrumed on links at $f^5$, pivoted to the foot of the cross-head at its rear, and having on its outer end a slidable weight $f^6$, which is adjustable thereon and secured thereto by means of a bolt $f^7$, all as clearly shown in Figs. 2, 3, and 4.

The mounting of the lower clamping-ring upon a slidable sleeve which is vertically adjustable on the spindle is a valuable feature, whether or not said sleeve be a part of a cross-head and regardless of the means by which it is rendered adjustable, because it is thereby adapted to clamp hat-bodies of all sizes.

The cross-head $f$ is carried upon two links $g$ $g$, which at their lower ends are hinged to the horizontal end of a bell-crank lever $g'$, (shown detached in Fig. 7,) which is fulcrumed upon a pin $g^2$, carried by arms projecting from the cross-head $d$, by way of which the lifting mechanism is connected with the spindle C' near its foot. Upon this same fulcrum-pin $g^2$ a pendent yoke $g^3$ is hinged, as shown in detail in Fig. 6. This yoke is provided at one side with a lateral stud, on which a roll $g^4$ is mounted, and it also has at its lower end a central hub, which is screw-threaded and occupied by an adjusting-screw $g^5$, provided with a lock-nut $g^6$. The roll $g^4$ has a rolling abutment against the coincident edge of a vertical arm or lever $h$, which is pivoted at its base, as indicated in Figs. 2 and 4, and capable of being vibrated, but which, nevertheless, always serves as an abutment for the yoke $g^3$, the vertical bearing edge of said arm being normally parallel with the spindle, so that when the machine is at rest on turning the adjusting-screw $g^5$ the bell-crank lever $g'$ may be so set as to locate the lower clamping-ring F, with its cross-head and weight, at either of its three positions of adjustment, i. e., raised from the position shown for coöperating with a larger ribbed former, or lowered when used with a former adapted to stretch the tips of smaller hat-bodies.

The vibrative lever $h$ before referred to, when its top is moved to and fro, so swings the pendent yoke $g^3$ as to actuate the bell-crank lever $g'$, which causes the clamping-ring F, with whatever it may be carrying, to be lifted from and lowered to any one of its positions of adjustment.

The lever $h$ is intermittingly actuated by means of a brim-clamp cam $F^2$ on the cam-shaft D. Said cam has six lifting-faces $h'$, with appropriate drop-faces, and the cam is so set with relation to the spindle-cam $C^2$ that the faces $h'$ operate practically simultaneously with the drop-faces of the spindle-cam, as is clearly indicated in Fig. 4. Power is communicated from the cam $F^2$ to an arm $h^2$, having a roll at one end for contact with the face of the cam and at the other end keyed to a rock-shaft $h^3$, carrying at one end an arm $h^4$, coupled by a link $h^5$ to an arm $h^6$ on another rock-shaft $h^7$, which is at the front of the machine and has a pendent arm $h^8$, provided with a lateral pin or stud which occupies a vertical slot $h^9$ in the upper end of the lever $h$. This organization for lifting the brim-clamp independently of the spindle would have substantial value in a machine having no hat-rotating mechanism, in which case the hat, being always fully released from the ribbed former, could be promptly rotated by hand.

It will be seen that the actual lifting action of the cam $F^2$ upon the brim-clamp is not great, and it might be less, even, than is indicated by the comparative diameters of the cams $F^2$ and $C^2$, it being only important that the cam $F^2$ should assume full control over the brim-clamp during the short descents of the ribbed former. It will also be seen that the yoke $g^3$ and the bell-crank lever $g'$ are enabled to coöperate because of the abutment of the adjusting-screw against the pendent arm of the bell-crank lever, and should the adjusting capacity be otherwise provided for it will be obvious that the bell-crank lever and the yoke might be consolidated into one piece, as, for instance, as illustrated in Fig. 10, wherein the pendent arm of said lever is shown with a lateral stud for the roll $g^4$. With this arrangement the adjustment of the position of the clamping-ring would be effected by practically elongating the links between the bell-crank lever and the cross-head $f$. As shown in this Fig. 10, the links $g$ $g$ are rigidly united at their lower ends by a yoke-piece $g^6$, through which extends a screw-threaded rod or link $g^7$, which is made to serve as a rigid link extension by means of the hand-nuts $g^8$ and $g^9$, the lower end of said rod or link being pivoted to the horizontal arm of the bell-crank lever and the hand-nuts enabling the adjustment of the cross-head which carries the lower clamping-ring.

The upper clamping-ring F' differs in many ways in its construction and in its organization with its controlling mechanism from the corresponding ring in the old machine. This upper brim-clamp ring F' normally rests upon a cross-head $i$, comprising an annular plate bolted to two guide-bearings which are slidably mounted on the reciprocated rods $a'$ and $a^2$, these serving as guides for said cross-head, as well as for operating the stretching-fingers. This cross-head $i$ is suspended by links $i'$ $i'$ from the ends of arms or levers $i^2$ $i^2$ on a rock-shaft $i^3$, having an arm $i^4$, which is coupled by a pendent link $i^5$ with the lever $d^2$, which lifts and lowers the spindle C'.

The upper ring F' is readily lifted by the lower ring from the supporting cross-head $i$ during the stretching operation, and it is lowered as the spindle and former rise, but when the spindle is lowered the cross-head carries the upper ring upwardly, leaving space above the lowered former favorable to the prompt and ready application of hat-bodies to the former and their removal therefrom. In order that this upper ring may do proper clamping duty, it is made sufficiently heavy by an annular weight $i^6$, carried upon several vertical rods or posts $i^7$, which are firmly mounted upon the ring and have lateral pins for supporting the weight, and are thus adapted to receive additional weights, if need be.

The lower clamping-ring F being free to rotate, power is applied to the upper clamping-ring F' for rotating the brim-clamp as a whole with a hat-body when properly interposed and clamped between the rings. In the old machines a spur-gear was employed, but in this machine there is a ratchet-wheel having an annular bearing-hub on the lateral frame-plate $A^4$. Instead of serving as a support for the upper ring and its weight, as the spur-gear did in the old machines, this ratchet-wheel $k$ carries no burdens, because the rods or posts $i^7$ slide freely in holes provided therefor in the rim of the wheel and the upper ring and its weight is always either supported by the cross-head $i$, as when out of service, or by the lower clamping-ring when both are in actual service and engaged with a hat-body.

In the old machine power was continuously applied to the brim-clamp by way of a spur-gear while the clamp was in actual service, and also from the time the ribbed former commenced to rise until it was fully dropped.

In this machine the brim-clamp, by way of the ratchet-wheel, is rotated intermittingly and only when the hat-body is not engaged by the stretching-fingers, the ribbed former being then dropped away from the fingers and the hat-body then having been lifted and freed from adhesive contact with the ribbed former. This intermitting rotation of the brim-clamp is effected by mechanism which, although somewhat similar to that employed in the brim-stretching machine disclosed in Patent No. 527,271, hereinbefore referred to, differs therefrom in many essential respects.

The ratchet-wheel $k$ rests upon and does not leave its annular bearing $k'$ on the lateral frame-plate $A^4$, and power is applied thereto by way of a horizontal pawl $k^2$, held against the teeth of the wheel by a spring and flexibly coupled by a bolt to a block secured to the end of the pendent arm of a bell-crank lever $k^3$, having its fulcrum on a stud $k^4$, projecting from a bracket rearwardly extended from the top of a side plate of the frame, as clearly indicated in Figs. 1, 3, and 8. The horizontal arm of the bell-crank lever $k^3$ is slotted to afford an adjustable coupling, by means of a clamp-bolt, with the top of a rod $k^5$, which at its foot is hinged to one end of an arm $k^6$, the other end being loosely hinged upon the rock-shaft E. The outer or free end of the arm $k^6$ carries a roller which bears upon the face of a cam G on the cam-shaft D. This cam G has a series of lifting-faces $l$ and lowering-faces $l'$, so set with relation to the several lowering-faces of the spindle-cam $C^2$ that each time the latter causes the partial lowering of the ribbed former the cam G actuates the pawl $k^2$ and imparts to the brim-clamp (and to the hat-body carried by it) sufficient rotative movement to insure the presentation of fresh portions of the tip to the action of the stretching devices.

It is of course immaterial to portions of the present invention by what means power is communicated from the cam G to the brim-clamp so long as the step-by-step or ratchet action is provided for when the hat-body has been lifted from the ribbed former and free from the stretching-fingers.

The old automatic tip-stretching machine contained no hat heating and moistening appliances, but these are specially important in the new machine for enabling it to perform its work with great rapidity and without liability of injuring hat-bodies.

The spindle C', at its upper end, carries an inverted cup $m$, which is within the ribbed former and adapted to deliver steam within a hat-body during the tip-stretching operation, the spindle being tubular to serve as a duct and having a lateral induction pipe or nozzle at $m'$, Figs. 2 and 3, which, by means of a flexible tube, (shown in dotted lines in Figs. 1 and 2,) is coupled with the nozzle $m^2$ of the steam-cock $m^3$, through which steam intermittingly passes from the supply-pipe $m^4$. This steam-cock is automatically operated by the cam which actuates the lever which lifts and lowers the spindle carrying the ribbed former, the cock being connected with said lever by a link $m^5$, all substantially as in the brim-stretching machine of Letters Patent No. 527,271, although, instead of being connected directly with the lever $d^2$, this link is coupled to an arm $m^6$, which is keyed to the outer end of the rock-shaft E, to which rocking motion is imparted by the lever $d^2$ when tilted by the spindle-actuating cam $C^2$, and hence the supply of steam to the hat-body will be varied according to the position of the ribbed former and its relation to the overlying stretching devices.

The application of power to the several shafts in the machine is fully indicated in Figs. 1 and 2. The main shaft B' is belted from cone-pulleys on it to similar pulleys on a counter-shaft H, carrying a centrally-located friction-clutch having specially-large contact-faces and a small gear $n$ at its outer end, which meshes with a large gear $n'$ on one end of another counter-shaft H', which in turn by gears $n^2$ and $n^3$ is coupled to the cam-shaft D.

The friction-clutch $H^2$ is controlled by a spring and by a hand-lever $H^3$, as in prior hat-machines, and the automatic stopping mechanism which limits the movement of the cam-shaft to one complete revolution is as heretofore. As shown in Figs. 2, 3, and 4, there is the usual spring-actuated shipper-yoke $p$ on a rock-shaft $p'$, having at its inner end a lateral lever $p^2$, which underlies the hand-lever $H^3$, this latter, when the machine is at work, being in the path of the pendent stop-pin $p^3$, which is carried on a rigid arm projecting from the spindle C', so that as the latter descends after completing the tip-stretching operation the hand-lever is depressed, which in turn overcomes the spring which forces the faces of the friction-clutch into adhesive or driving contact.

The operation of a machine constructed as described and having its main shaft driven at about four hundred revolutions per minute and with the cam-shaft being at rest is substantially as follows: A hat-body taken from an adjacent hot-water or steaming kettle is placed upon the ribbed former and over the lower clamping-ring. The hand-lever $H^3$ is then moved to the one side, which permits the spring of the clutch $H^2$ to act for driving the cam-shaft D. As the hat is being lifted the upper clamping-ring descends until it is freed from its cross-head and has engaged with the hat-body and clamped it at the lower ring F and by its weight so far overcome the clamp balance-weight $f^6$ as to cause the hat-body to be evenly and lightly pulled downwardly upon the former. The tip of the hat-body is then lightly presented to the stretching-fingers for a few seconds, steam being in the meantime freely delivered within the hat-body. The spindle is then so lowered as to free the hat-body from the stretching-fingers, and simultaneously therewith the hat is freed from the ribbed former by the lifting action of the brim-clamp, which is then so rotated as to present fresh portions of the tip of the hat to the action of the stretching-fingers. The hat-body is again raised slightly higher than before to enable the stretching devices to properly operate, after which the lowering and lifting is repeated twice with intermediate rotation and each time with an increased extent of the hat-lifting movement, and then it is lifted twice to the same (or full) height, with the same intermediate lowering and rotating movements, thus completing the stretching operation, which is followed by a final rotation and a lifting of the hat to a lesser height than before, so that the stretching-fingers, by lightly operating on the tip, will eliminate the creases therein which were formed by the ribs and the fingers during the stretching operation. The spindle is then fully dropped, the steam cut off, the upper clamping-ring elevated to its highest position, and the stop-motion operated, the entire operation occupying from twenty to twenty-five seconds, according to the speed at which the clutch-shaft H may be driven.

Having thus described said invention, the features believed to be novel, and desired to be secured by Letters Patent, are—

1. In an automatic hat-tip-stretching machine, the combination with tip-stretching devices, of brim-clamping rings; a ratchet-wheel and pawl mechanism, operatively coupled to one of said rings the other being free to rotate; and a cam which is operatively connected with said mechanism and intermittingly operates it substantially as described, for imparting to both of the clamping-rings sufficient rotary movement to enable the presentation of various portions of the tip of a clamped hat-body to the action of the tip-stretching devices.

2. In an automatic hat-tip-stretching machine, the combination with tip-stretching devices, of a brim-clamp, and means for rotating it, and a cam which lifts and lowers said brim-clamp at intervals and while the stretching devices are inoperative, substantially as described, whereby a hat-body carried by the clamp is wholly freed from the hat-supporting portion of the stretching devices preparatory to rotation.

3. In a hat-tip-stretching machine, the combination with a ribbed former and its spindle, of a cam, which during each rotation intermittingly lifts and lowers said former; an upper clamping-ring; a lower brim-clamping ring concentric to said former, and adapted to support an overlying clamping-ring with an interposed hat-body, and a cam which intermittingly lifts said clamping-rings, substantially as described.

4. In a hat-tip-stretching machine, the combination substantially as hereinbefore described, of a ribbed former, a lower brim-clamping ring vertically adjustable with relation to the ribbed former, and an upper brim-clamping ring which when clamping a hat-body is carried by the lower ring, whereby hat-bodies of all sizes may not only be properly clamped by the one pair of rings, but each hat-body be properly seated upon the ribbed former.

5. In a hat-tip-stretching machine, the combination with a ribbed former carried on a slidable spindle, of a slidable sleeve on said spindle, a brim-clamping ring slidable on said sleeve and concentric with said former, and means for variably locating said sleeve vertically on the spindle, substantially as described, for enabling said clamping-ring and its upper coöperating weighted ring, to properly coöperate with ribbed formers of various sizes, and to properly clamp hat-bodies of all sizes.

6. In a hat-tip-stretching machine, the combination with the slidable spindle which carries the ribbed former, and the main cross-head by which said spindle is coupled to its controlling mechanism, of a brim-clamping ring, and a sleeved cross-head carrying said ring and slidably mounted on said spindle; a bell-crank lever on said main cross-head; links coupling said lever with the sleeved cross-head, and a cam with appropriate mechanism between it and the bell-crank lever, substantially as described, for vibrating the lever, and controlling the lifting and lowering of the clamping-ring, independently of the vertical movements of the spindle and ribbed former.

7. In a hat-tip-stretching machine, the combination with the rib-former, its spindle and the main cross-head by which the spindle is coupled to its actuating mechanism, of a brim-clamping ring, a sleeved cross-head carrying said ring and slidably mounted on said spindle; a bell-crank lever on the main cross-head; links which couple the horizontal arm of said lever to the sleeved cross-head; a pendent hinged yoke on the main cross-head; an adjusting-screw in said yoke which engages with the pendent arm of said lever for adjustably raising and lowering the clamping-ring, and an abutment for said yoke which prevents its movement during the lifting adjustment of the clamping-ring.

8. In a hat-tip-stretching machine, the combination of a sleeve slidably mounted and variably adjustable at fixed positions on the spindle which carries the ribbed former; a brim-clamping ring slidably mounted on said sleeve; a collar slidably mounted below said ring on said sleeve and supported on a lever which is fulcrumed on said sleeve and carries at its free end an adjustable weight, which maintains the collar and clamping-ring at the upper end of said sleeve.

9. In a hat-tip-stretching machine, the combination with stretching-fingers, a ribbed former, and its slidable spindle, of a spindle-actuating cam provided with a series of lifting-faces having progressively greater lifting capacities, and also provided with intermediate carrying and lowering faces, substantially as described.

10. In a hat-tip-stretching machine, the combination with the stretching-fingers the ribbed former and its spindle, of a cam having a series of lifting and carrying faces, which during each rotation, intermittingly lifts the spindle and places the ribbed former into coöperative relations with the stretching-fingers for stretching the tip of a hat-body, and also having a terminal carrying-face lower than the preceding face, which at the completion of the stretching operation carries the spindle and former at a slightly-lowered position, substantially as described, for enabling the stretching-fingers to lightly operate upon the stretched tip of a hat-body for removing the creases incident to the stretching operation.

11. In an automatic hat-tip-stretching machine, the combination with a lower brim-clamping ring, of an upper brim-clamping ring, an intermittingly-rotated wheel to which said ring is coupled, an annular cross-head on which said upper ring is normally supported, and controlling mechanism for said cross-head, substantially as described, whereby the upper ring is automatically lowered from its elevated normal position for placing it into, and leaving it in coöperative clamping relations with the lower ring, and then lifted by said cross-head to its normal position at the completion of each stretching operation.

RUDOLF EICKEMEYER, JR.,
*Executor of the estate of Rudolf Eickemeyer, deceased.*

Witnesses:
HENRY OSTERHELD,
O. B. WARING.